UNITED STATES PATENT OFFICE.

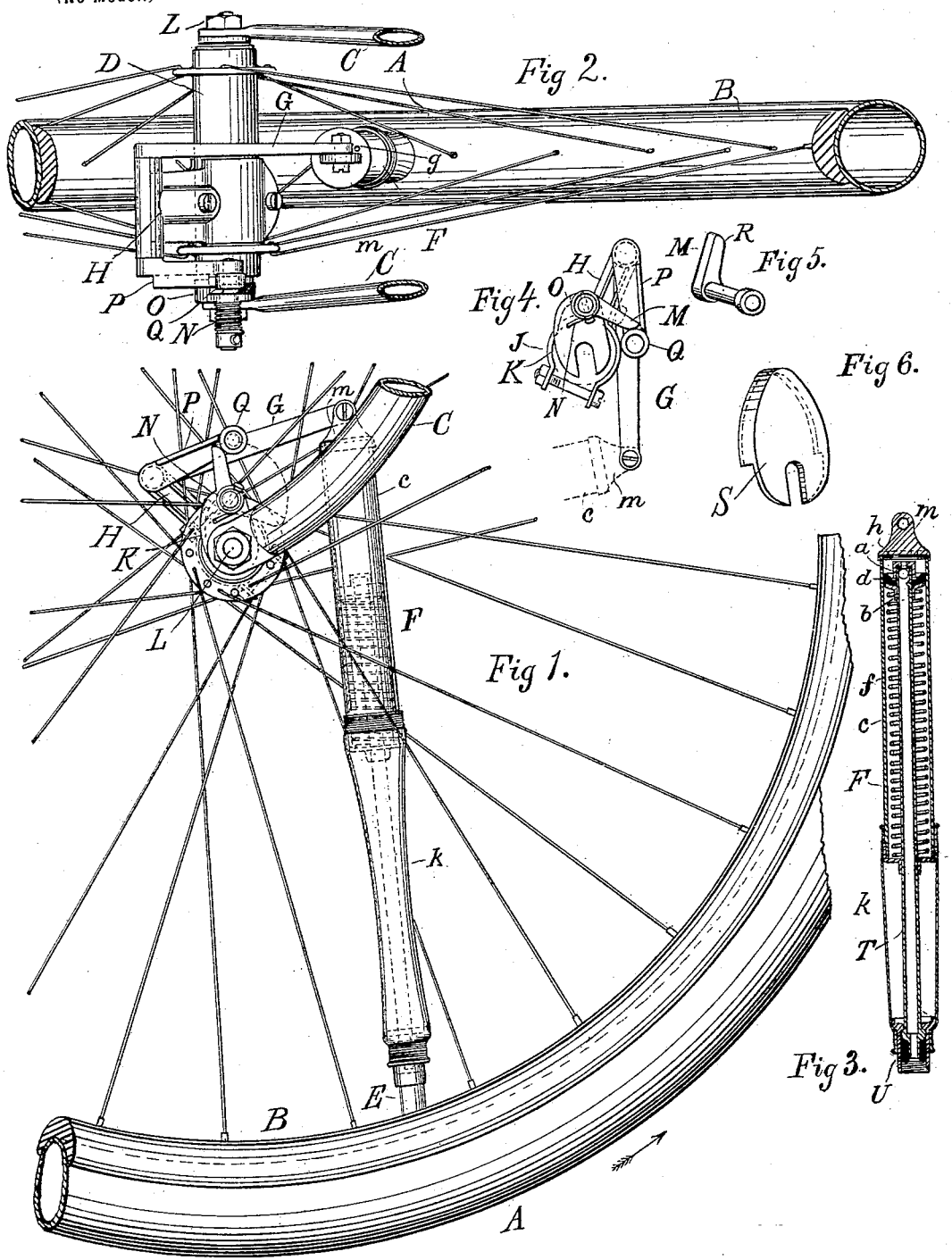

PAUL HANSON, OF CHICAGO, ILLINOIS.

AUTOMATIC BICYCLE-PUMP.

SPECIFICATION forming part of Letters Patent No. 632,784, dated September 12, 1899.

Application filed January 21, 1898. Serial No. 667,500. (No model.)

*To all whom it may concern:*

Be it known that I, PAUL HANSON, a citizen of the United States, residing at Chicago, in the county of Cook and State of Illinois, have invented a new and useful Automatic Bicycle-Pump, of which the following is a specification.

This invention relates to automatic bicycle-pumps.

The object of the invention is to provide an arrangement of pump for bicycles whereby through the revolution of the wheel the tire is maintained constantly inflated.

The invention consists, substantially, in the construction, location, arrangement, and combination of parts, all as will be more fully hereinafter set forth, as shown in the accompanying drawings, and finally specificaly pointed out in the appended claims.

Referring to the accompanying drawings and to the various views and reference-signs appearing thereon, Figure 1 is a broken view in side elevation of a portion of a bicycle-wheel, showing the application thereto of an automatic pump in accordance with the principles of my invention. Fig. 2 is a plan view of the construction shown in Fig. 1. Fig. 3 is a central longitudinal sectional view through the pump. Fig. 4 is a detached detail view of the devices for operating the pump. Fig. 5 is a detached detail view, slightly in perspective, of the operating-dog. Fig. 6 is a detached detail view, slightly in perspective, of a modified arrangement which may be used in place of the dog shown in Fig. 5.

The same part is designated by the same reference-sign wherever it occurs.

In the drawings, reference-sign A designates the tire; B, the rim of the wheel to which the tire is applied; C, the frame of the bicycle, and D the hub.

The tire A is provided with the usual stem E, arranged to project through an opening in the wheel felly or rim in the usual manner and to which may be attached a pump F. To the upper end of the pump is secured one end G of a lever suitably journaled in a bracket H, formed with a clamping portion J, adapted to be clamped around a suitable part of the wheel to revolve therewith. A convenient arrangement is to secure this bracket upon the hub D, as shown. A clip K is arranged to be secured upon a fixed part of the frame—as, for instance, upon the axle L of the wheel. Pivotally mounted upon this clip is a dog M. A spring N normally holds this dog in folded position relative to said clip. By suitably pivoting the dog M upon clip K the spring N may be omitted; but I prefer to employ a spring in this relation. A shoulder (indicated at O) formed on clip K forms a stop to limit the rocking motion of pawl M against the action of spring N. In Fig. 1 this pawl is shown abutting against this shoulder and in dotted lines in its folded or retracted position. The other end of bell-crank lever G is flanged, as at P, and also carries a projection Q, which may be in the form of an antifriction-roller, and is arranged to traverse an orbit or path adapted to contact with the free end of pawl M and cause the same to rock about its pivot and into position for the free end thereof to engage flange P and rock said lever about its pivot, thereby rocking arm G, and hence operating the pump.

The operation of the parts so far described is as follows: The end of arm G of the bell-crank lever is attached to the movable part of the pump, the other end of the pump being suitably connected to the valve-stem E as the wheel proceeds over the ground, thereby rotating the same. The projecting end Q of the other arm of said lever engages behind pawl M, as shown in Fig. 4, thereby rocking said pawl about its pivot and causing the free end thereof to engage underneath flange P, thereby rocking said arm and also arm G, formed integrally therewith, and hence drawing outwardly the movable part of the pump. Suitable means, such as a spring, are provided for moving said movable part of the pump in the opposite direction. The rocking of pawl M causes the same to abut against shoulder O, thereby arresting its rocking movement. The continued rotation of the wheel causes the projection Q to ride over the end of the pawl. To facilitate this action, the rear corner of the pawl is rounded off, as indicated at R, Fig. 5. The moment the end of pawl M is cleared by projection Q said pawl returns under the influence of spring N to its normally folded or retracted position and the spring or other yielding medium effects a return of the movable part of the pump, thereby causing a jet of air to be forced into the tire. This operation continues until the pressure in the tire counterbalances the spring or yielding part of the pump, whereby the arm G, and consequently the projection Q, of the bell-crank lever are lifted, thus enabling the wheel to rotate without said projection Q engaging the end of pawl M when held in its folded or retracted position. The wheel continues to revolve under these conditions and without projection Q engaging pawl M until through leakage, puncture, or the like the air-pressure in the pump or tire is reduced to a point such as to enable the projection Q to again engage the end of pawl M, whereupon the above operation is repeated at each revolution of the wheel until such pressure is restored. Thus the action of the pump is automatic and positive.

Instead of the pawl M, which, however, is the preferred construction, I may employ a cam-shaped clip S, as shown in Fig. 6, rigidly mounted on the wheel-axle and over which the projection Q operates.

Many specifically different forms of construction of pumps may be employed in connection with my invention. Therefore while I have shown and will now describe a simple and efficient construction of pump which is admirably adapted for my purposes I do not desire to be limited or restricted thereto. In the form shown I employ a long tube T, (see Fig. 3,) suitably connected to a nipple U at one end, which nipple is adapted to be screwed upon the end of the valve-stem E. At the other end of this tube is arranged an inwardly-opening valve. This may be, if desired and as shown, in the form of a ball $a$, suitably retained, as by means of a shoulder $b$, punched in the side of said tube a sufficient distance from the end thereof to provide a desirable amount or range of movement of the valve. Arranged to surround the end of the tube T and to slide lengthwise upon said tube is a sleeve $c$, which forms the movable part of the pump. Suitably secured to the valved end of tube T is a head $d$, forming the piston of the pump, upon which the cylindrical sleeve $c$ is arranged to operate. A spring $f$, interposed between the end of sleeve $c$ and piston-head $d$, normally operates to maintain said sleeve collapsed or telescoped upon said tube. The end of sleeve $c$ is provided with an opening (indicated at $g$, Fig. 2) opening communication from the interior thereof to the outer air. This opening is controlled on the inside by an inwardly-opening valve (indicated in solid black lines at $h$, Fig. 3) in the usual manner of pump constructions. If desired, and in order to aid the spring $f$ in returning the cylindrical sleeve $c$ to its normal position, I may attach a flexible sleeve or casing $k$ at one end to the end of said cylinder $c$ and at the other end to the nipple U. The natural torsion of sleeve $k$ also serves to prevent the pump from unscrewing from stem E. If desired, the spring $f$ may be entirely omitted and the flexible sleeve or casing $k$ employed for the purpose of performing the entire work of maintaining the cylinder $c$ in its normal position. In the same manner the flexible casing may be dispensed with and merely the spring $f$ employed for this purpose; but the flexible casing $k$ is desirable as a protection against dust, sand, grit, or the like collecting on the outer surface of tube T, and thus wearing the bearing through which it slides in the pump-cylinder F, finally resulting in leaking of the pump and loss of efficiency. A head $m$ is formed at the end of the pump-cylinder $c$, to which the end of arm G of the bell-crank lever is attached. The piston $d$ and also the nipple U are suitably packed to prevent leakage and at the same time to permit a slight rocking movement of the tube without incurring the danger of leakage.

From the foregoing description it will be seen that I provide a construction of pump wherein the pump is rigidly held to the wheel and is revolved therewith, but is permitted a slight vibration in order to accommodate the arc in which the end of lever G rocks, and by reason of its substantial rigidity danger of accident by reason of the connection between said lever G and the head $m$ of the pump is avoided, for the pump would be held in sufficiently rigid relation to the spokes as to avoid falling out from between them.

From the foregoing description it will be seen that I provide an exceedingly simple and efficient pump which is automatic in its operation, which may be applied to any wheel, and which efficiently maintains the tire pumped up and the action of which is arrested when the tire is pumped to a sufficient degree of pressure. It will also be seen that when the tire has been pumped up to a desired degree, or when desired the rider may, by simply removing clip $k$, carrying pawl M, or by simply removing said pawl and storing the same in his pocket or tool-bag, arrest the action of the pump until it is again desired to automatically operate the pump. Similarly the pump itself may be unscrewed from stem E and stored until again required for use, or it may be used as ordinary hand-pump. It will also be seen that comparatively little power is consumed in effecting the inflation of the tire and would hardly be noticed in practice by the rider. This is due to the fact that the operating parts of the pump are driven from a slowly-rotating part of the wheel — namely, that part adjacent to the hub — and through the long leverage secured by the construction above described, as well as the momentum developed by the wheel in use, but little effect will be transmitted to the power required to drive the pedals. An arrangement constructed in accordance with my invention not only maintains the tire properly and suitably inflated, but in case of a moderate puncture will enable a rider to proceed without having to shoulder his wheel and walk.

Many changes in the details of construction and arrangement of parts would readily suggest themselves to persons skilled in the art and still fall within the spirit and scope of my invention. I do not desire, therefore, to be limited or restricted to the exact details shown and described; but, Having now set forth the object and nature of my invention and a form of apparatus embodying the same and having described its construction, function, and mode of operation, what I claim as new and useful and of my own invention, and desire to secure by Letters Patent of the United States, is—

1. In a wheel, the combination with a tire, a pump arranged to deliver therein and comprising a stationary tube and an inclosing cylinder, means for yieldingly maintaining said cylinder telescoped upon said tube, and devices actuated by the revolutions of the wheel for moving said cylinder in the opposite direction, as and for the purpose set forth.

2. In a wheel, the combination with a tire, a pump arranged to deliver therein and including a stationary tube, a cylinder arranged to telescope thereon, a flexible casing connected at one end to said cylinder and at the other end to said tube and normally operating to maintain said cylinder telescoped upon said tube, an arm carried by the wheel to rotate therewith and connected to said cylinder, and means arranged to be engaged by said arm for rocking the same, thereby moving said cylinder against the action of said flexible casing, as and for the purpose set forth.

3. In a wheel, the combination with a tire, of a pump including a tube, a flexible connection between said tube and tire whereby said tube is permitted a slight vibratory movement, a cylinder arranged to telescope upon said tube, means for yieldingly maintaining said cylinder in one limit of its movement, an arm pivotally mounted to rotate with said wheel and connected with said cylinder, and means for rocking said arm, as and for the purpose set forth.

4. In a wheel, a pneumatic tire, a pump arranged to deliver into the tire, yielding means normally acting to operate said pump in a direction to deliver into said tire, devices for positively operating said pump in the opposite direction, said devices arranged to be arrested automatically when the tire has been inflated to the desired degree, whereby the pump action is also arrested, as and for the purpose set forth.

5. In a wheel, a pneumatic tire, a pump, yielding means normally acting to operate said pump in a direction to deliver into said tire, a lever pivotally connected to said pump for positively moving the same in the opposite direction, and a dog arranged to engage and operate said lever during the rotation of the wheel, as and for the purpose set forth.

6. In a wheel, a pneumatic tire, a pump carried by the wheel, yielding means normally acting to operate said pump in a direction to deliver into said tire, a lever carried by the wheel and arranged when rocked to positively move said pump in the opposite direction, and a pivoted dog arranged in the path of said lever for engaging and rocking the same, as and for the purpose set forth.

7. In a wheel, a pneumatic tire, a pump carried by the wheel, yielding means normally acting to operate said pump in a direction to deliver into said tire, a lever carried by the wheel and connected to the pump for positively operating the pump in the opposite direction, a clip arranged to be mounted on a fixed part of the wheel-frame, a dog pivotally mounted thereon and arranged in the path of said lever to engage and rock the same, and a spring arranged to normally hold said dog in retracted position, as and for the purpose set forth.

8. In a wheel, a pneumatic tire, a pump carried by said wheel, yielding means normally acting to operate said pump in a direction to deliver into said tire, a bell-crank lever suitably journaled and also carried by said wheel and having one of the arms thereof connected to said pump, a projection formed on the other arm of said lever, and a dog arranged in the path of said projection to engage and rock the same, whereby said pump is positively operated in the opposite direction, as and for the purpose set forth.

In witness whereof I have hereunto set my hand, this 12th day of January, 1898, in the presence of the subscribing witnesses.

PAUL HANSON.

Witnesses:
S. E. DARBY,
FRANK T. BROWN.